United States Patent [19]
Kotwal et al.

[11] Patent Number: 5,483,791
[45] Date of Patent: Jan. 16, 1996

[54] TURBOPROP WITH IMPELLER INLET STRAKE

[75] Inventors: Rangnath A. Kotwal; Jacob S. Obayomi, both of Phoenix; Henry J. Ruzicka, Mesa; William F. Waterman, Scottsdale, all of Ariz.

[73] Assignee: AlliedSignal Inc., Morris Township, N.J.

[21] Appl. No.: 259,595

[22] Filed: Jun. 14, 1994

[51] Int. Cl.⁶ ........................................ F02C 7/04
[52] U.S. Cl. .................. 60/39.31; 137/15.1; 244/53 B; 415/182.1
[58] Field of Search ............... 60/39.31, 39.32, 60/259, 726; 137/15.1, 15.2; 244/53 B; 415/182.1, 183, 185, 191, 192

[56] References Cited

U.S. PATENT DOCUMENTS

| | | |
|---|---|---|
| 2,646,211 | 7/1953 | Isabella . |
| 2,801,790 | 8/1957 | Doll ........................................ 415/192 |
| 4,121,606 | 10/1978 | Holland et al. ........................ 137/15.1 |
| 4,318,669 | 3/1982 | Wennerstrom . |
| 4,456,458 | 6/1984 | Gilbertson . |
| 4,720,235 | 1/1988 | Lachance et al. . |
| 4,844,695 | 7/1989 | Banks et al. . |
| 4,938,021 | 7/1990 | Jones et al. .......................... 244/53 B |
| 5,114,097 | 5/1992 | Williams .............................. 244/53 B |
| 5,284,012 | 2/1994 | Laborie et al. . |

*Primary Examiner*—Louis J. Casaregola
*Attorney, Agent, or Firm*—Jerry J. Holden; James W. McFarland; John R. Rafter

[57] ABSTRACT

A turboprop engine has in flow series arrangement a crescent shaped inlet, an annular plenum, a compressor, a combustor, and a turbine. The plenum is defined by inner and outer annular walls. A support member referred to as a "boat tail" extends between the walls and is circumferentially positioned 180 degrees from the inlet. A strake extends downstream from the support member and is angled in a direction opposite the rotational direction of the compressor. Thus air entering the engine with either positive or negative swirl is forced to enter the impeller with negative swirl.

4 Claims, 3 Drawing Sheets

1

TURBOPROP WITH IMPELLER INLET STRAKE

TECHNICAL FIELD

The present invention relates to gas turbine engines, and in particular to turboprop engines.

BACKGROUND OF THE INVENTION

Some aircraft use counter rotating propellers on opposite wings. For example, the engine mounted on the left wing may have a clockwise rotating propeller while the engine mounted on the right wing has a counterclockwise rotating propeller. The air entering the engine must first flow through the propeller whose pumping action swirls the air in the direction the propeller is rotating. A disadvantage to this counter rotating configuration is that for at least one engine the propeller rotates in the same direction as its internal components. Under these conditions the propeller imparts positive swirl to the entering air. Positive swirl is swirl in the direction of rotation of the engine's compressor, and results in the engine's compressor producing lower flow and pressure ratio ,than when the propeller imparts negative swirl. Negative swirl is swirl in the direction of rotation opposite that of the engine's compressor.

Accordingly, there is a need for an turboprop engine in which the airflow entering the compressor has negative swirl regardless of the direction of propeller rotation.

SUMMARY OF THE INVENTION

An object of the present invention is to provide a turboprop engine in which the airflow entering the compressor has negative swirl, regardless of the direction of propeller rotation.

The present invention achieves this objective by providing a turboprop engine having in flow series arrangement a crescent shaped inlet, an annular plenum, a compressor, a combustor, and a turbine. The plenum is defined by inner and outer annular walls. A support member referred to as a "boat tail" extends between the walls and is circumferentially positioned 180 degrees from the inlet. A strake extends downstream from the support member and is angled in a direction opposite the rotational direction of the compressor. Thus air entering the engine with positive swirl is turned to negative swirl, while air entering with negative swirl remains unchanged.

DESCRIPTION OF THE PREFERRED EMBODIMENT

Figure 1:
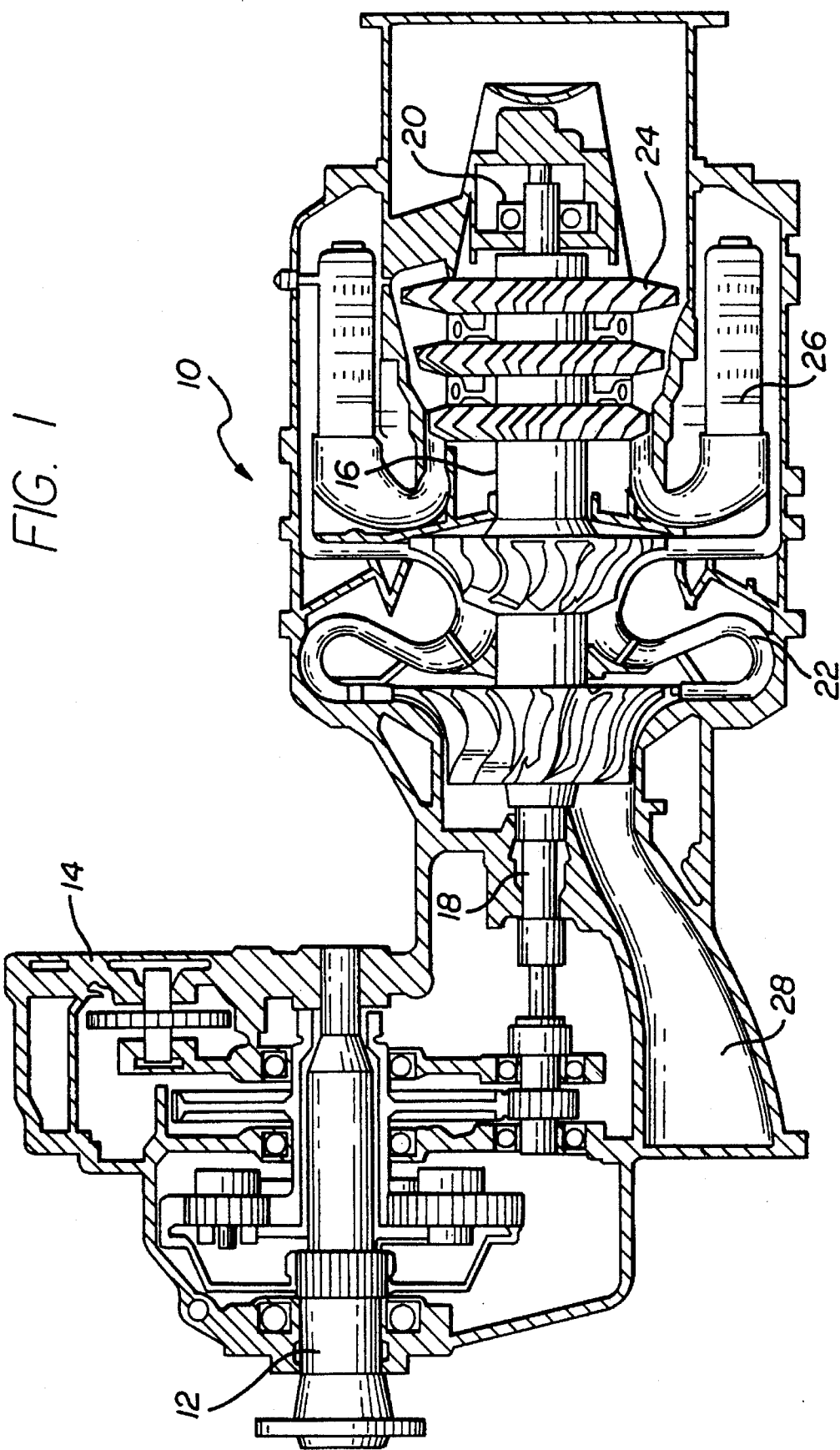
FIG. 1 is a cross-sectional illustration of an AlliedSignal TPE331 turboprop engine.

An AlliedSignal TPE331 turboprop engine 10 is illustrated in FIG. 1. The engine is comprised of a propeller shaft 12 mounted to a gearbox 14. An engine shaft 16 mounted for rotation on front and rear bearings 18, 20 drives the gearbox 14. Mounted to the engine shaft 16 are a two stage centrifugal compressor 22 and a three stage axial turbine 24. A combustor 26 is disposed between the compressor 22 and the turbine 24.

In operation, air is ingested through an inlet 28, is compressed in the compressor 22, and then mixed with fuel and the mixture ignited within the combustor 26. The hot gas exiting the combustor 26 is expanded to ambient pressure by the turbine 24. Through this expansion the turbine 24 extracts thermal energy from the gas and converts it mechanical power which drives the shaft 16.

Figure 2:
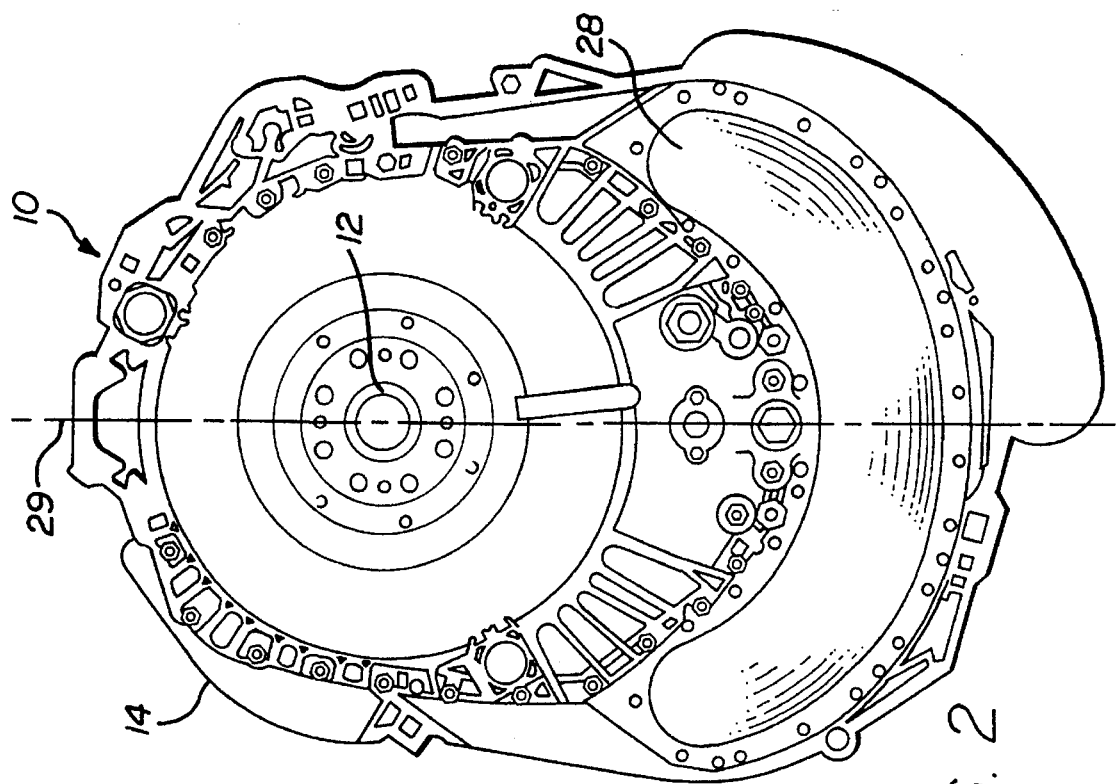
FIG. 2 is a front view of the engine of FIG. 1.
Figure 3:
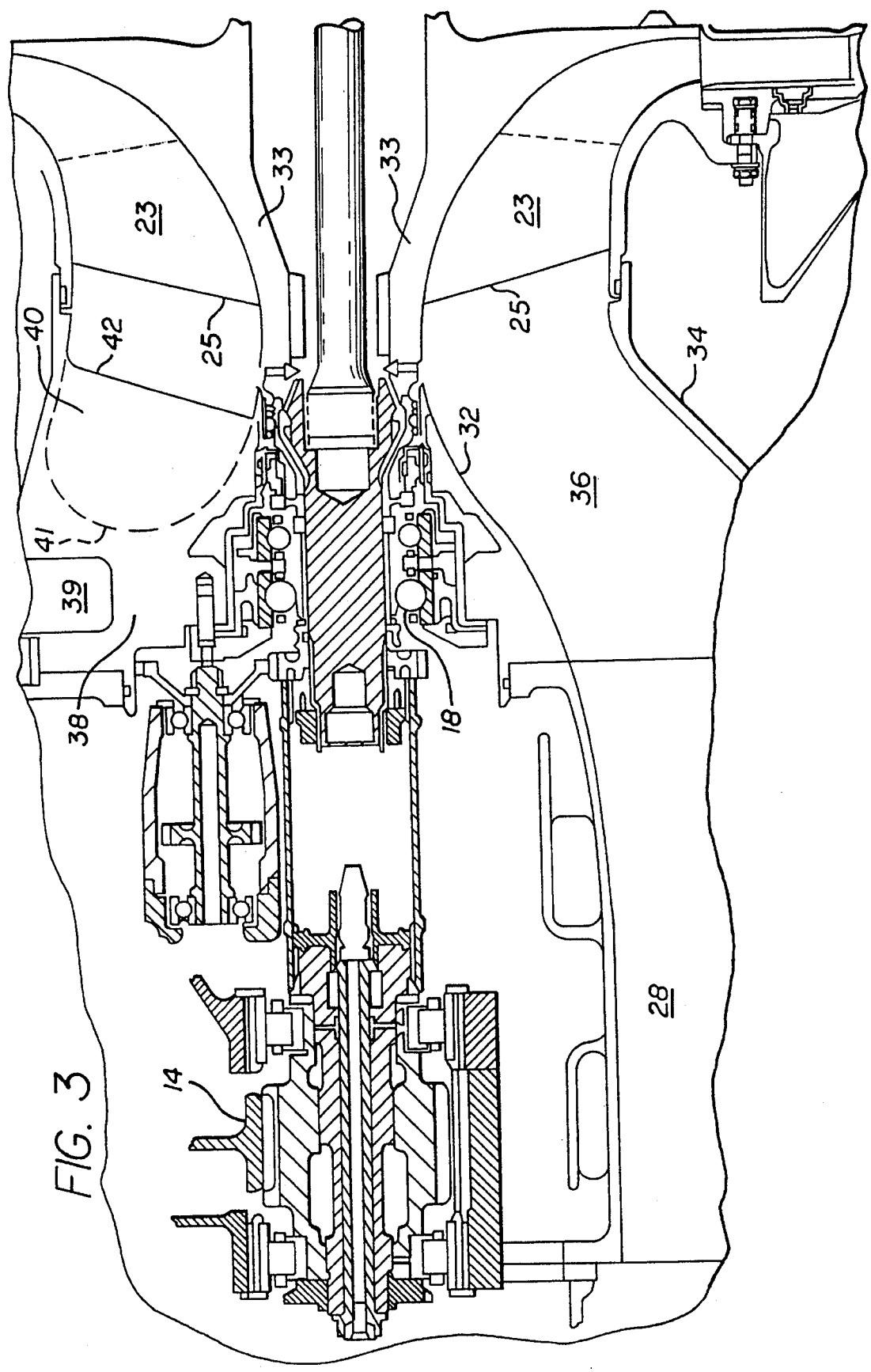
FIG. 3 is an enlarged, cross-sectional view of the inlet of a TPE331 engine having the impeller inlet strake contemplated by the present invention.

Referring to FIGS. 2 and 3, the inlet 28 is crescent shaped and symmetric about the engine's radial axis 29. This type of inlet configuration is referred to as a "smile" inlet and is usually located at the bottom or top of the engine 10. Between the inlet 28 and the first stage of the compressor 22 is a front bearing 18 support housing that includes an inner annular wall 32 in which the front bearing 18 is mounted. An outer annular wall 34 circumscribes the inner wall 32 and is radially spaced therefrom to define a transition plenum 36. Within the plenum 36 the air flows towards the first stage impeller 23 and up and around both sides of the wall 32 and compressor hub 33. Connecting the inner wall 32 to the outer wall 34 is a triangular shaped support structure 38, referred to by those skilled in the art as a "boat tail". For weight reduction purposes, the boat tail 38 has a hollowed center 39. The boat tail 38 is circumferentially positioned 180 degrees from the inlet 28.

Figure 4:
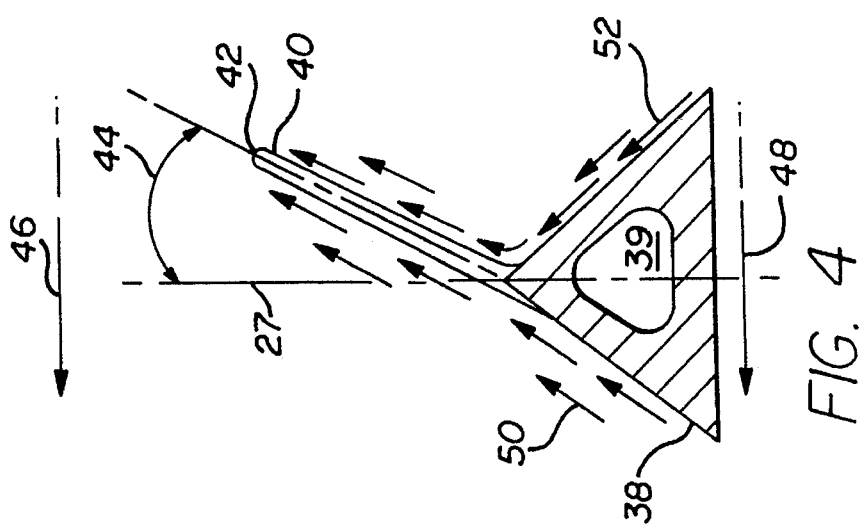
FIG. 4 is a top view illustration of the impeller inlet strake of FIG. 3.

Extending from the boat tail axially towards the impeller 23 is an impeller inlet strake 40 having a leading edge illustrated by the dashed line 41. The strake 40 extends radially from the inner wall 32 to the outer wall 34 and has a trailing edge 42 sloped to be parallel with the leading edge 25 of the impeller 23. The strake 40 is preferably cast integral with the boat tail 38, however the strake 40 can be a separate piece. As shown in FIG. 4, the strake is at an angle 44 from the engine's axial axis 27 in the rotational direction opposite that of the impeller 23. That is, if the impeller 23 is rotating counterclockwise, as illustrated by arrow 46, the strake 40 is angled in the clockwise direction. Likewise, if the impeller 23 is rotating clockwise, the strake 40 is angled in the counterclockwise direction. The angle 44 is selected so that the air flowing off the strake 40 is aligned with the inlet flow vector of the particular impeller 23, to maximize engine performance.

Referring to FIG. 4, with a counterclockwise rotating propeller, represented by arrow 48, there is a local flow 50 with negative swirl in the plenum 36 and a local air flow 52 with positive swirl. Positive swirl is swirl in the direction of rotation of the impeller 23 and negative swirl is swirl in the direction of rotation opposite that of the impeller 23. When the flow 52 hits the strake 40, it is turned so that its swirl becomes negative and it enters the impeller 23 at the correct angle. The flow 50 is not turned, but is directed to the impeller 23 at the correct angle. As a result, regardless of the rotational direction of the propeller and impeller 23, with a properly positioned strake 40, the air entering the impeller 23 will always have negative swirl.

Various modifications and alterations to the above described preferred embodiment will be apparent to those skilled in the art. Accordingly, this description of the invention should be considered exemplary and not as limiting the scope and spirit of the invention as set forth in the following claims.

What is claimed is:

1. In a gas turbine engine having in flow series arrangement a compressor, a combustor and a turbine, said engine comprising:

a crescent shape air inlet;

an annular plenum defined by an outer annular wall circumscribing and radially spaced from an inner annular wall and disposed between said inlet and said compressor;

a support member extending between said inner and outer annular walls and disposed in said plenum; and a strake member extending from said support member towards said compressor and angled from said support member in a direction opposite the direction of rotation of said compressor.

2. The engine of claim 1 wherein said strake has a trailing edge parallel with a leading edge of said compressor.

3. The engine of claim 2 wherein said support member is circumferentially positioned 180 degrees from said air inlet.

4. The engine of claim 3 wherein said strake member is integral with said support member.

* * * * *